(12) United States Patent
Shimura et al.

(10) Patent No.: US 10,571,689 B2
(45) Date of Patent: Feb. 25, 2020

(54) DISPLAY SYSTEM, MOBILE INFORMATION UNIT, WEARABLE TERMINAL AND INFORMATION DISPLAY METHOD

(71) Applicant: Olympus Corporation, Tokyo (JP)

(72) Inventors: Kazuhiko Shimura, Hachioji (JP); Kazuo Kanda, Higashiyamato (JP); Yoshiyuki Fukuya, Sagamihara (JP); Nobuyuki Shima, Machida (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 113 days.

(21) Appl. No.: 15/690,266

(22) Filed: Aug. 29, 2017

(65) Prior Publication Data

US 2018/0067309 A1 Mar. 8, 2018

(30) Foreign Application Priority Data

Sep. 2, 2016 (JP) .................................. 2016-171709

(51) Int. Cl.
| | | |
|---|---|---|
| *G02B 27/01* | (2006.01) | |
| *G06F 1/16* | (2006.01) | |
| *G06F 3/03* | (2006.01) | |
| *B64C 39/02* | (2006.01) | |
| *G06F 3/01* | (2006.01) | |

(52) U.S. Cl.
CPC ........ *G02B 27/0101* (2013.01); *B64C 39/024* (2013.01); *G02B 27/017* (2013.01); *G02B 27/0172* (2013.01); *G06F 1/163* (2013.01); *G06F 3/011* (2013.01); *G06F 3/0304* (2013.01); *G02B 2027/014* (2013.01); *G02B 2027/0138* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 2014/0191929 A1* | 7/2014 | Kim | ....................... | G06F 3/1454 345/8 |
| 2015/0325202 A1* | 11/2015 | Lake | ....................... | G09G 5/003 345/520 |
| 2016/0349849 A1* | 12/2016 | Kwon | ..................... | G06F 3/011 |
| 2018/0061128 A1* | 3/2018 | Cabanier | .................. | G09G 5/12 |

FOREIGN PATENT DOCUMENTS

JP 2011253324 A 12/2011

* cited by examiner

*Primary Examiner* — Kenneth B Lee, Jr.
(74) *Attorney, Agent, or Firm* — John C. Pokotylo; Pokotylo Patent Services

(57) ABSTRACT

A display system, that is capable of displaying substantially the same content on a wearable terminal that is attached to the head of a user and has a first display section, and on a unit other than the wearable terminal that has a second display, comprises a controller that determines an object the user is gazing at, and a display controller that controls update of display states based on the object that has been determined, when an image, that has been displayed on the second display, is displayed on the first display.

12 Claims, 11 Drawing Sheets

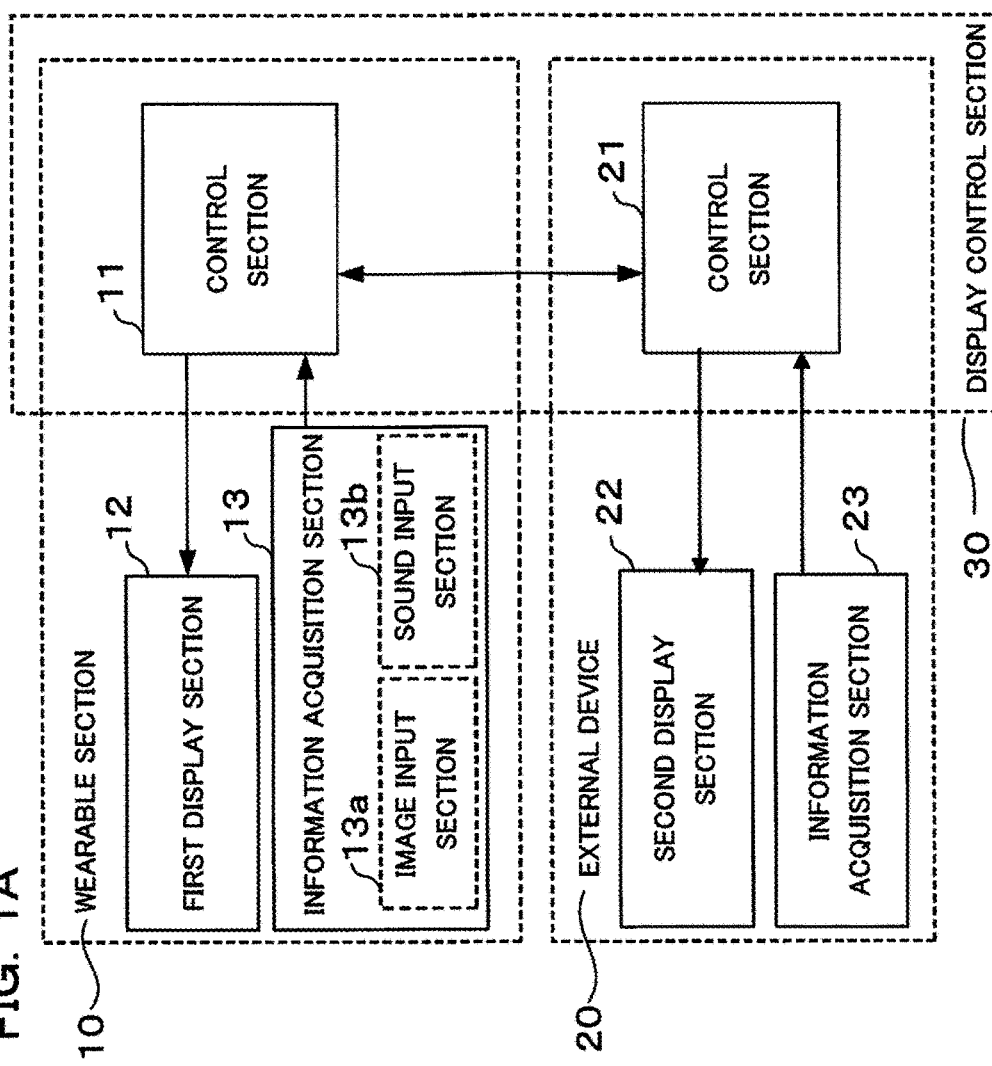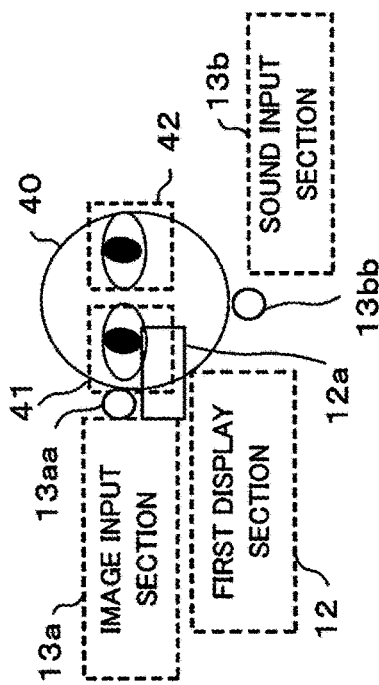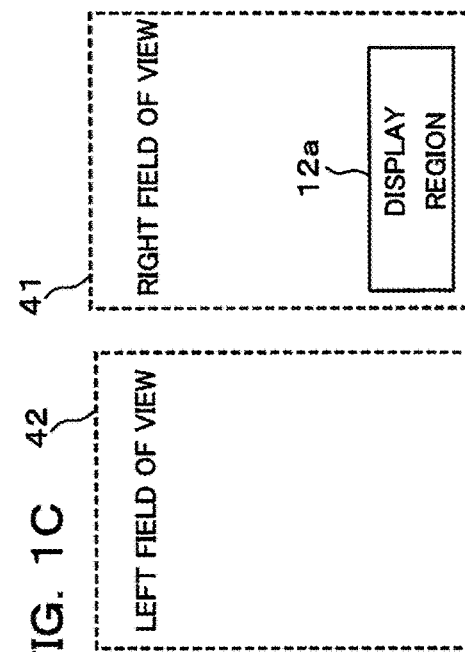

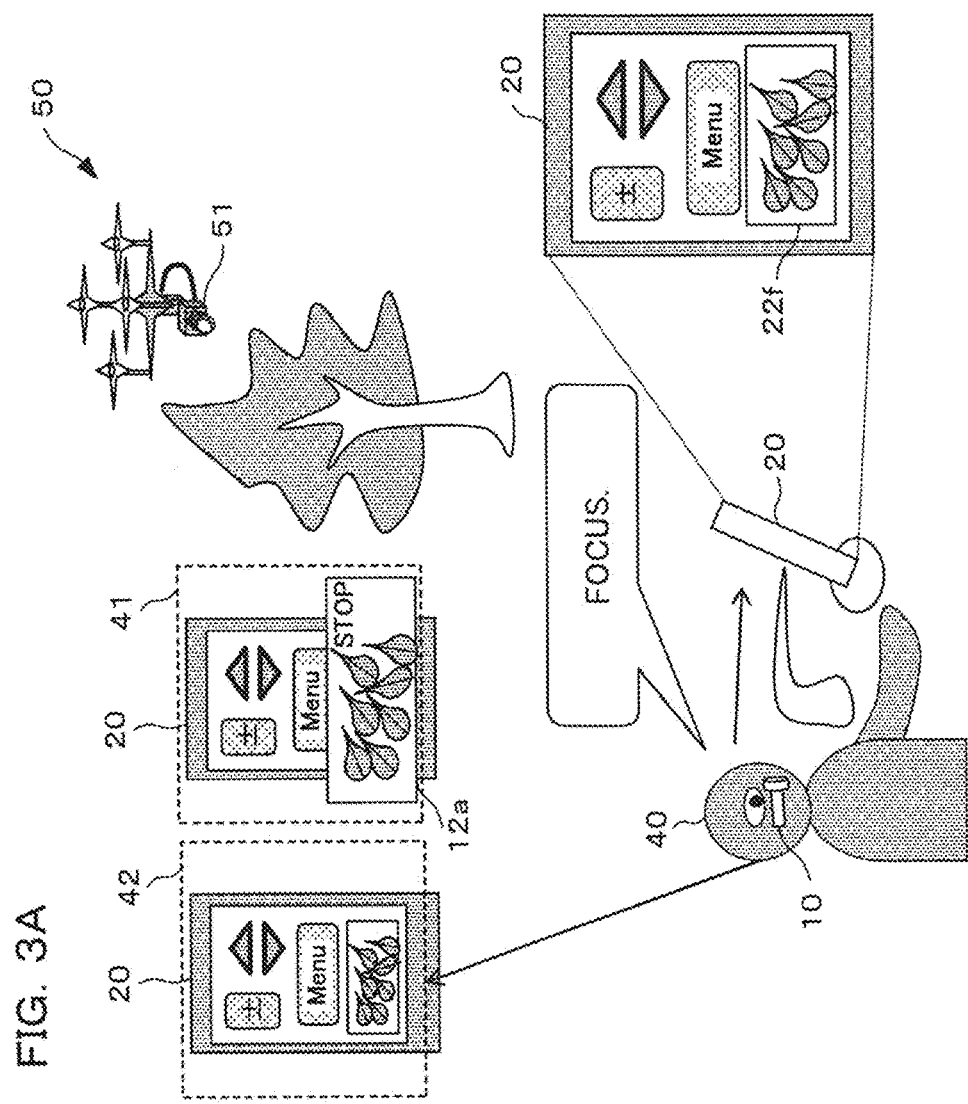

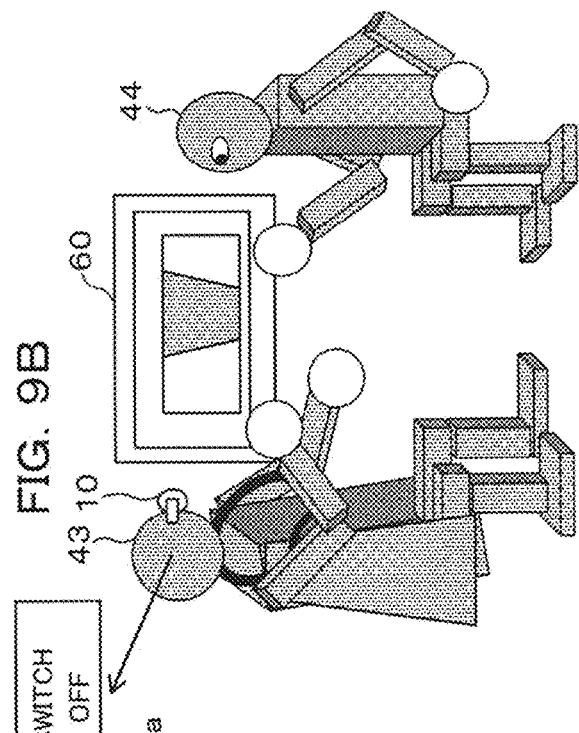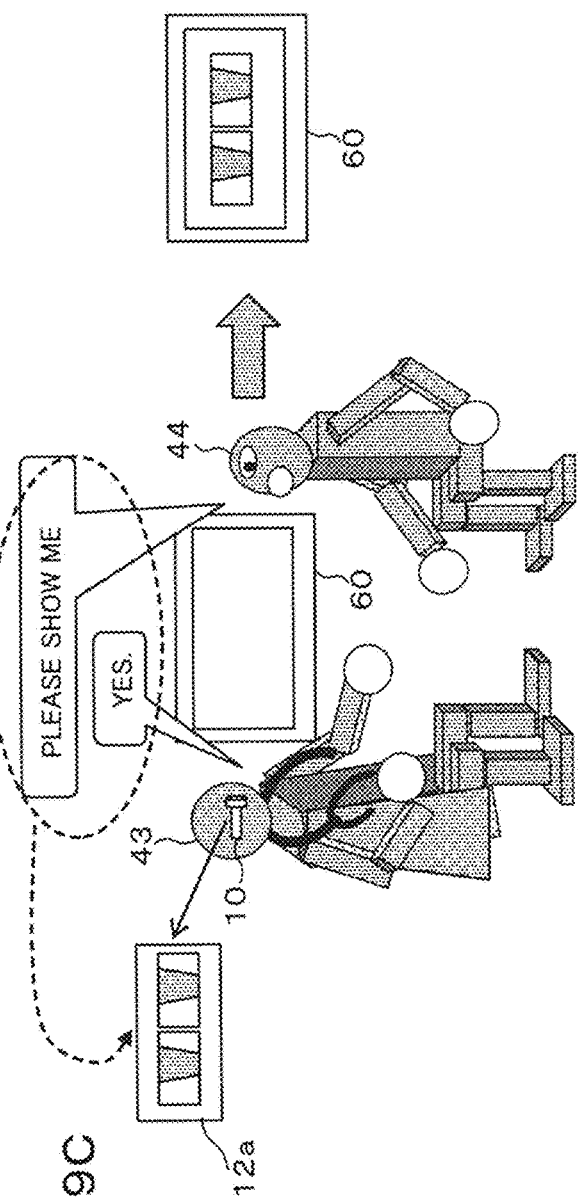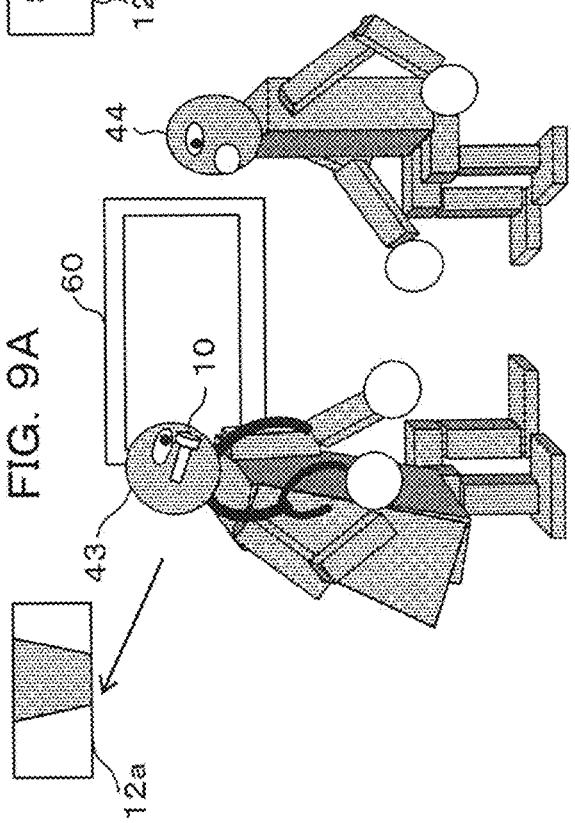

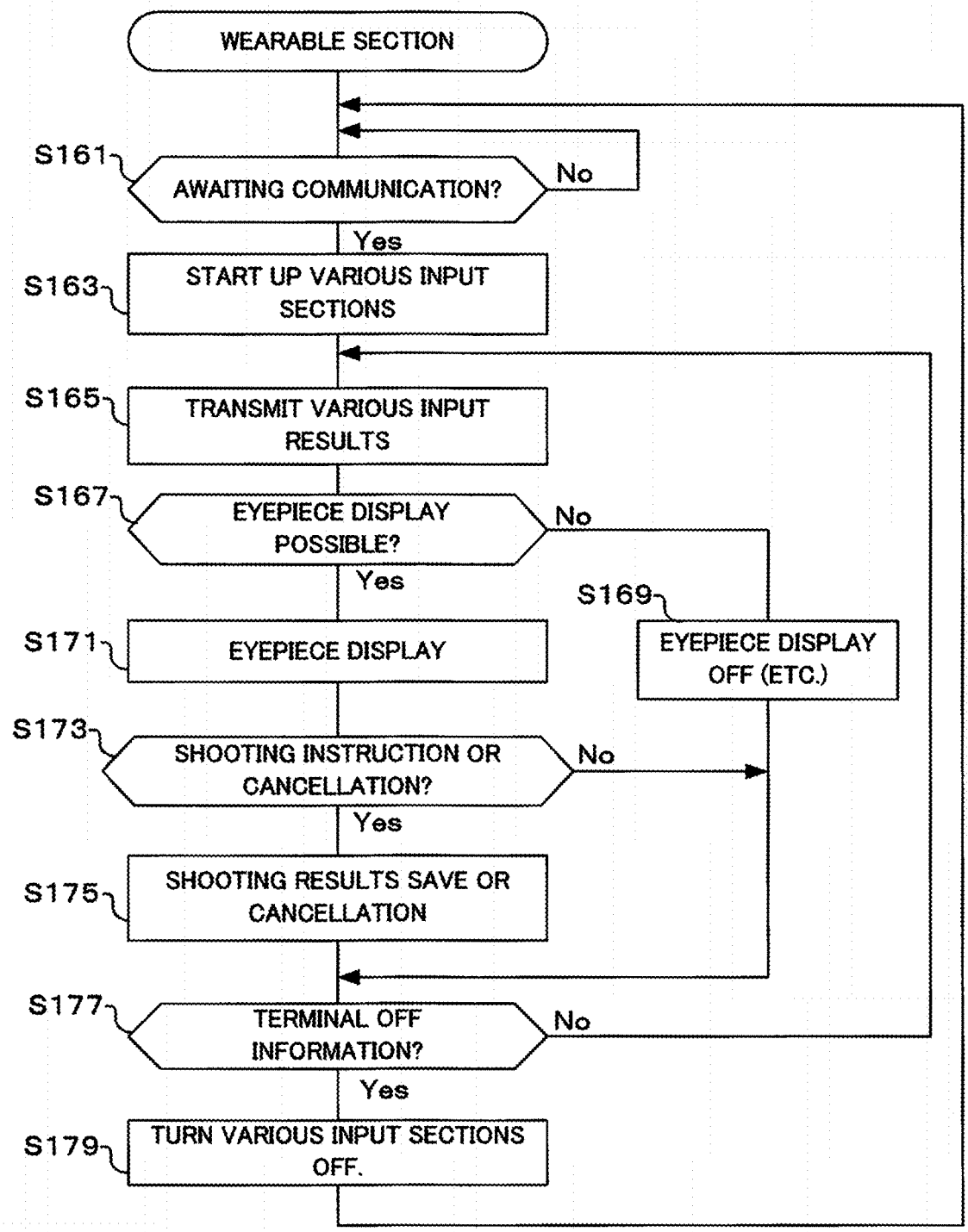

DISPLAY SYSTEM, MOBILE INFORMATION UNIT, WEARABLE TERMINAL AND INFORMATION DISPLAY METHOD

CROSS-REFERENCE TO RELATED APPLICATIONS

Benefit is claimed, under 35 U.S.C. § 119, to the filing date of prior Japanese Patent Application No. 2016-171709 filed on Sep. 2, 2016. This application is expressly incorporated herein by reference. The scope of the present invention is not limited to any requirements of the specific embodiments described in the application.

BACKGROUND OF THE INVENTION

1. Field of the Invention

The present invention relates to a wearable terminal having a glasses type viewfinder display section, a display system, and mobile information unit, and to an information display method.

2. Description of the Related Art

In recent years, so-called augmented reality (AR) has been developed, and it has become possible to display images of virtual objects, such as CG (computer graphics) generated by a computer such that the virtual object is in reality space. For example, there has been proposed a wearable terminal whereby the user fits glasses having a display section (the wearable terminal), and the wearable terminal displays various information on a display section superimposed on a reality space if the user visualizes the reality space by means of this wearable terminal (refer to Japanese patent laid open No. 2011-253324 (hereafter referred to as "patent publication 1")).

SUMMARY OF THE INVENTION

A display system of a first aspect of the present invention is a display system that is capable of displaying substantially the same content on a wearable terminal that is attached to the head of a user and has a first display, and on a unit other than the wearable terminal that has a second display, this display system comprising: a controller that determines an object the user is gazing at, and a display controller that controls update of display states based on the object that has been determined, when an image, that has been displayed on the second display, is displayed on the first display.

A mobile information unit of a second aspect of the present invention is capable of communication with a wearable terminal that has a first display that is attached to the head of a user, and that is capable of passing visible light in a direction in which the user directly views reality space, the mobile information unit comprising: a second display that is provided on the mobile information unit, a controller that detects an object the user is gazing at, and a display controller that controls change of display format based on the object, when an image, that has been displayed on the second display, is displayed on the first display.

A wearable terminal of a third aspect of the present invention is capable of communication with a mobile information terminal having a second display and a controller that determines an object that a user is gazing at, a first display provided on the wearable terminal, and a display controller that controls change of display format based on the object, when an image, that has been displayed on the second display, is displayed on the first display.

An information display method of a fourth aspect of the present invention is capable of displaying substantially the same content on a wearable terminal that is attached to the head of a user and has a first display, and on a unit other than the wearable terminal and that has a second display, the information display method comprising: detecting an object by the user is gazing at, and controlling change of display format based on the object, when an image, that has been displayed on the second display, is displayed on the first display.

An information display method of a fifth aspect of the present invention is an information display method for a mobile information unit that has a second display, and that is capable of communication with a wearable terminal that has a first display that is attached to the head of a user, and that is capable of passing visible light in a direction in which the user directly views reality space, the information display method comprising: detecting an object the user is gazing at, and controlling change of display format based on the object, when an image, that has been displayed on the second display, is displayed on the first display.

BRIEF DESCRIPTION OF THE DRAWINGS

FIG. 1A-FIG. 1C are block diagrams mainly showing the electrical structure of a display system of a first embodiment of the present invention.

FIG. 3A and FIG. 3B are drawings showing a usage state of the display system of the first embodiment of the present invention.

FIG. 9A-FIG. 9C are drawings showing usage states of an information display device of a second embodiment of the present invention.

FIG. 11 is a flowchart showing operation of a wearable section of the second embodiment of the present invention.

DETAILED DESCRIPTION OF THE PREFERRED EMBODIMENTS

Figure 2:
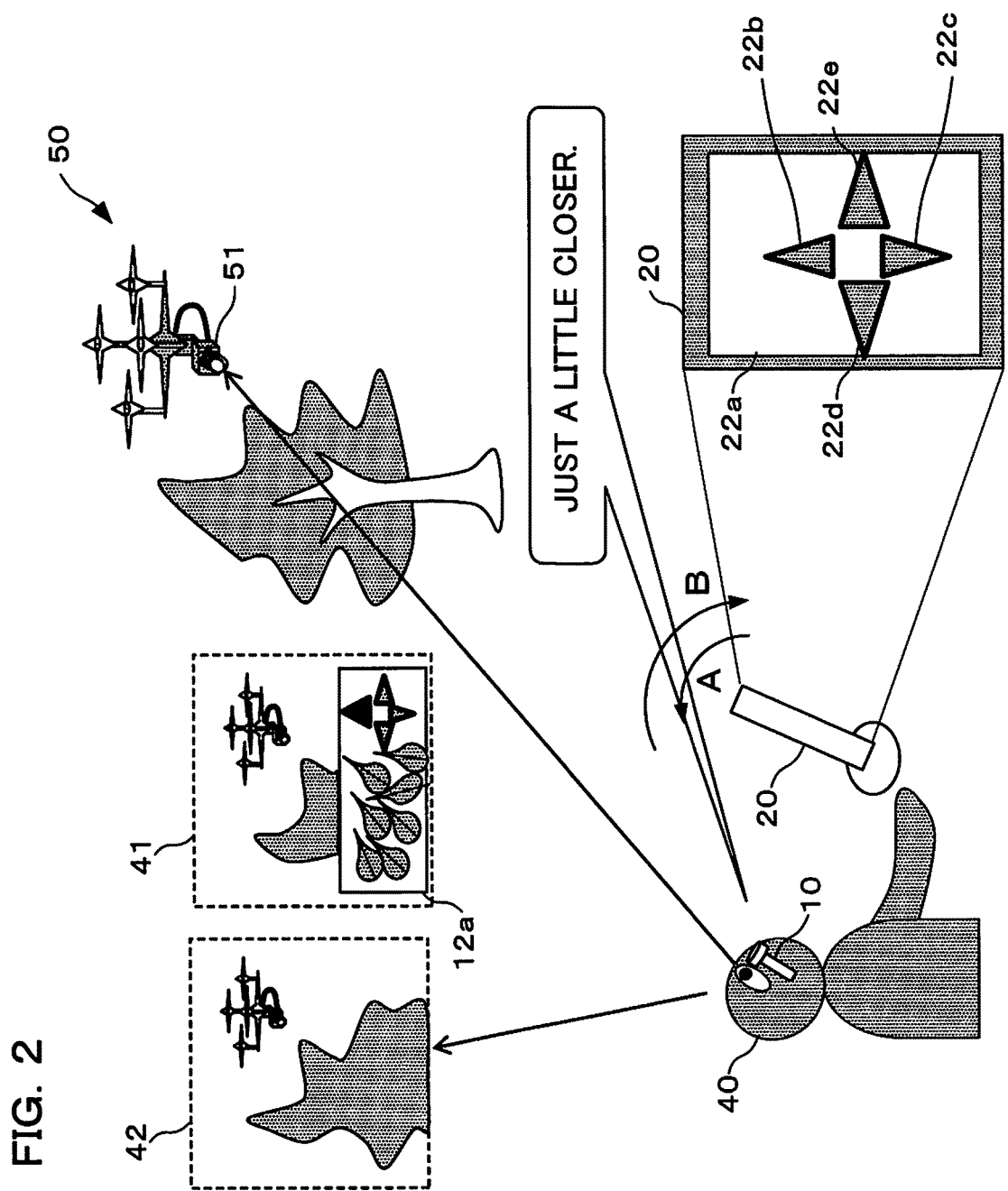
FIG. 2 is a drawing showing a usage state of the display system of the first embodiment of the present invention.

A display system comprising a glasses type information display device (hereafter called a wearable section 10) and an external unit 20 will be described in the following as a preferred embodiment of the present invention.

FIG. 1A is a block diagram showing the outline of an information display system, and FIG. 1B shows a state where a user 40 has attached the wearable section 10 to their head. The wearable section 10 has a so-called glasses shape, and has optical members 41 and 42, as well as an attachment section for attaching to the head of the user 40. It should be noted that the optical members 41 and 42 may be transparent glass or transparent plastic etc. that does not have refractivity. Also, the wearable section 10 has a control section 11, a first display section 12 and an information acquisition section 13.

This wearable section 10 functions as a wearable terminal that is attached to the head of a user and has a first display section. The wearable section 10 also functions as a wearable terminal that is attached to the head of a user and has a first display section that is capable of passing visible light in a direction in which the user directly views a reality space.

The first display section 12 has a display, and when the user 40 observes the outside world by means of a right eye optical member 41 an image that has been generated by the control section 11 is displayed on the display superimposed on a scene of the outside world. This optical member 41 is assumed to have a structure having a magnification function etc. for the display section, and sections besides the optical member 41 are transparent using see through elements. However, this is not limiting, and a translucent reflecting mirror or enlarged half mirror or the like may also be used.

As shown in FIG. 1C, the user 40 can observe a left field of view (optical binocular field of view) using the left eye optical member 42, but this optical member 42 may be transparent or the optical member may not be provided. Also, the right field of view (optical binocular field of view) can be observed using the right eye optical member 41, but this optical member 41 may also be transparent or not provided, as was described previously. It is also possible for the user 40 to observe an image, formed using the first display section 12, on the display region 12a below the right eye optical member 41.

It should be noted that while the display region 12a of the first display section 12 is provided on the side of the right eye optical member 41, this is not limiting, and the display region may also be provided on the side of the left eye optical member 42. At this time the display section constitutes the entire field of view, but if, for example, an imaging result in front that has been obtained by an information acquisition section 13, that will be described later, is displayed in order to keep objects right in front of the user from becoming invisible, the display section can also function similarly to being transparent.

This embodiment is proposed in view of the fact that a user will "gaze" at an object that is in the foreground in the real world. With a tendency to observe things using not only a sense of vision using their eyes, but also through the other 4 senses, users carry out actions better to observe objects in the real world more carefully. With this embodiment, actions to see object on the real world more carefully, namely, detecting conditions to see actual objects that are beyond the transparent, are called "gaze detection" or "gaze determination". Specifically, carrying out display switching intuitively, unconsciously and in a hands-free manner without special operations by detecting conditions such as gazing at an object that has been displayed virtually on a glasses type wearable terminal, and more than this, detecting gaze state of the real world accompanying variation in the user's attitude and posture etc. is described as this embodiment.

The information acquisition section 13 has an image input section 13a and a sound input section 13b. As shown in FIG. 1B, the image input section 13a has a camera 13aa that includes a photographing lens for forming an image, and an image sensor and image processing circuits etc. for subjecting images to photoelectric conversion. Image data that has been converted by the image input section 13a is output to the control section 11. The sound input section 13b has a microphone 13bb for converting voice to voice data, and the voice data that has been converted here is output to the control section 11. It should be noted that in FIG. 1B the first display section 12, image input section 13a, camera 13aa, sound input section 13b and microphone 13bb are depicted separately, but may be constructed integrally with the wearable section 10.

If the user stares at something, their eyes will be concentrating at a specified posture, and so "gazing" will be determined when a state such as there being no variation in the image or sound information for a given time has been detected. Alternatively, "gazing" may be determined in a case where an image that has been detected is a monitor image, where there is a image of a specified object that has been stored in advance by learning or a program, or where a sound that has been detected is the sound of a specified unit or the voice of the user.

With this embodiment, since display on a display section is switched in accordance with what is currently being looked at, providing the information acquisition section 13 in the wearable section 10, with which it is easy to determine the behavior, attitude and posture of the user, is advantageous. As well as detection of an image the user is looking at, variation and transitions etc. of the image being looked at may also be detected. The information acquisition section 13 and a movement sensor can both be used in gaze determination, but it is possible to use only either one of them, or a combination of the two. In either case, it becomes possible to determine time from when a given condition is achieved, and characteristics of transition from a given first state to a given second state etc.

Obviously, learning of that person's habits such as the way of uttering speech and moving their body (determination of whether or the user is satisfied using sound etc., and making training data) may also be used. Such an information acquisition section and movement sensor section may be provided separately, and fixation determination performed using that data, or fixation determination may also be carried out by another unit receiving that data. That is, it is possible to determine a fixation state for the user based on time variation characteristics of the user's posture, or based on continuation of posture for a specified time. This posture can be determined using movement itself, or a result of having moved, or an image itself or transition of an image.

The control section 11 has a CPU (Central Processing Unit), peripheral circuits for that CPU, and memory etc. The CPU implements the wearable section 10 overall by controlling each of the sections within the wearable section 10 in accordance with programs stored in memory. The peripheral circuits have an electronic compass for detecting which direction the wearable section 10 is facing in, an inclination detection sensor that measures gaze elevation angle, and a movement sensor section such as gyro that detects movement.

Also, as a peripheral circuit within the control section 11 there is a communication circuit, that carries out communication with the external unit 20. As a communication system wireless communication, such as WiFi and Bluetooth (registered trademark), or infrared communication may be used, and in this case a single communication system may be used, or both communication systems may be used. Also, in the event that both systems are used, image communication may be carried out using Wi-Fi communication utilizing broadcast mode or the like, and communication of control signals with the external unit may be carried out using Bluetooth (registered trademark).

The external unit 20 may be a unit having a display section and a communication circuit, such as a desktop PC (Personal Computer), a notebook PC, tablet PC or smartphone etc. With this embodiment, description will be been given for a case where a smartphone has been adopted as the external unit 20, but units besides a smartphone may also be used.

The external unit 20 has a control section 21, a second display section 22, and an information acquisition section 23. The external unit 20 functions as a unit other than the wearable terminal having a second display. This unit other than the wearable terminal and the wearable terminal are capable of displaying substantially the same content. The external unit 20 also functions as a mobile information unit having a second display and a controller that determines an object being gazed at by a user. It should be noted that this controller is not limited to being part of a mobile information unit, and may also be arranged on the wearable terminal. In this case, the controller determines an object the user is gazing at based on at least one of time variable characteristics of the user's posture, user's posture information, surrounding sound information, and image information that has been acquired using the image sensor.

The second display section 20 has a liquid crystal panel or organic EL panel etc., and displays images. As display images, in the case where the external unit 20 is a smartphone, there are menu screens for smartphone etc., and in the case of being linked to a drone, as will be described later, there are images etc. that have been transmitted from the drone. The information acquisition section 23 is for the user to input information to the external unit 20, and is, for example, a keyboard or touch panel etc.

The control section 21 has a CPU (Central Processing Unit), peripheral circuits for that CPU, and memory etc. The CPU implements the external unit 20 overall by controlling each of the sections within the external unit 20 in accordance with programs stored in memory. Also, as a peripheral circuit within the control section 21, there is a communication circuit that carries out communication with the wearable section 10 and a second external unit etc.

It should be noted that in FIG. 1A the control section 11 is arranged in the wearable section 10, and the control section 21 is arranged in the external unit 20. However, the function of a display control section 30 that carries out display control (including switching control) for the first display section 12 and the second display section 22 may be assumed by only the control section 11 or may be assumed by only the control section 21. Also, besides this role being assumed by only one control section, these functions may be implemented by the two control sections 11 and 21 acting cooperatively.

Whether or not the user is looking at the external unit 20 may be determined based on the shape of the external unit 20 using the image information that has been acquired by the image input section 13a, or may be determined using display content of the external unit 20. The determination may be supplemented by carrying out display of special content (for example, display for a device allowing easy reading such as a bar code or pattern etc.) on the external unit 20, and the special display may be combined with an emitted light pattern and a pronunciation pattern. Taking a look at the external unit 20 may be the user's intention, wanting to see it, and so may be classified as "gazing". By determining using time of gazing, a movement pattern etc. at the time of taking a look may be determined with images and movement (variations in posture).

Figure 4A:
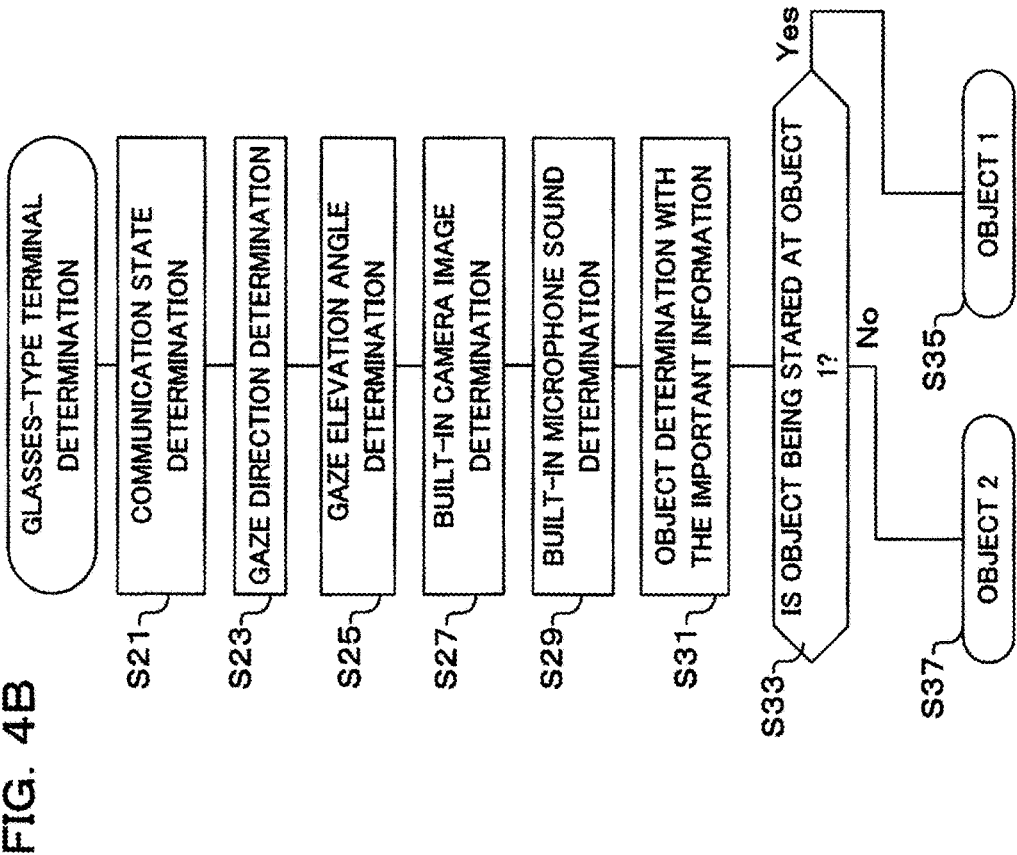
FIG. 4A and FIG. 4B are flowcharts showing operation of the display system of the first embodiment of the present invention.
Figure 4B:
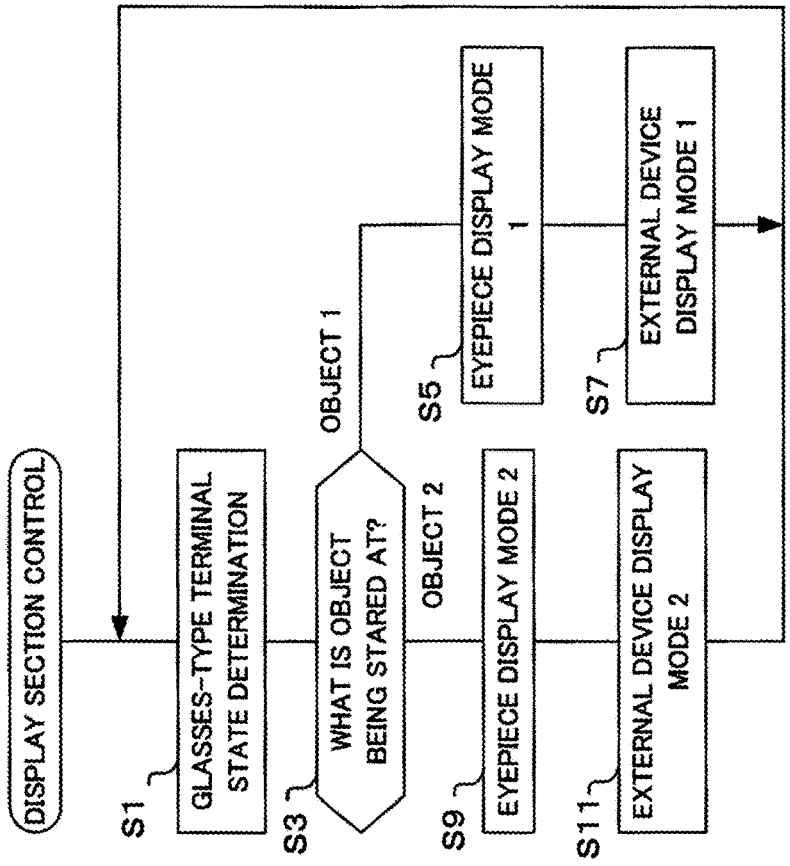
Figure 6:
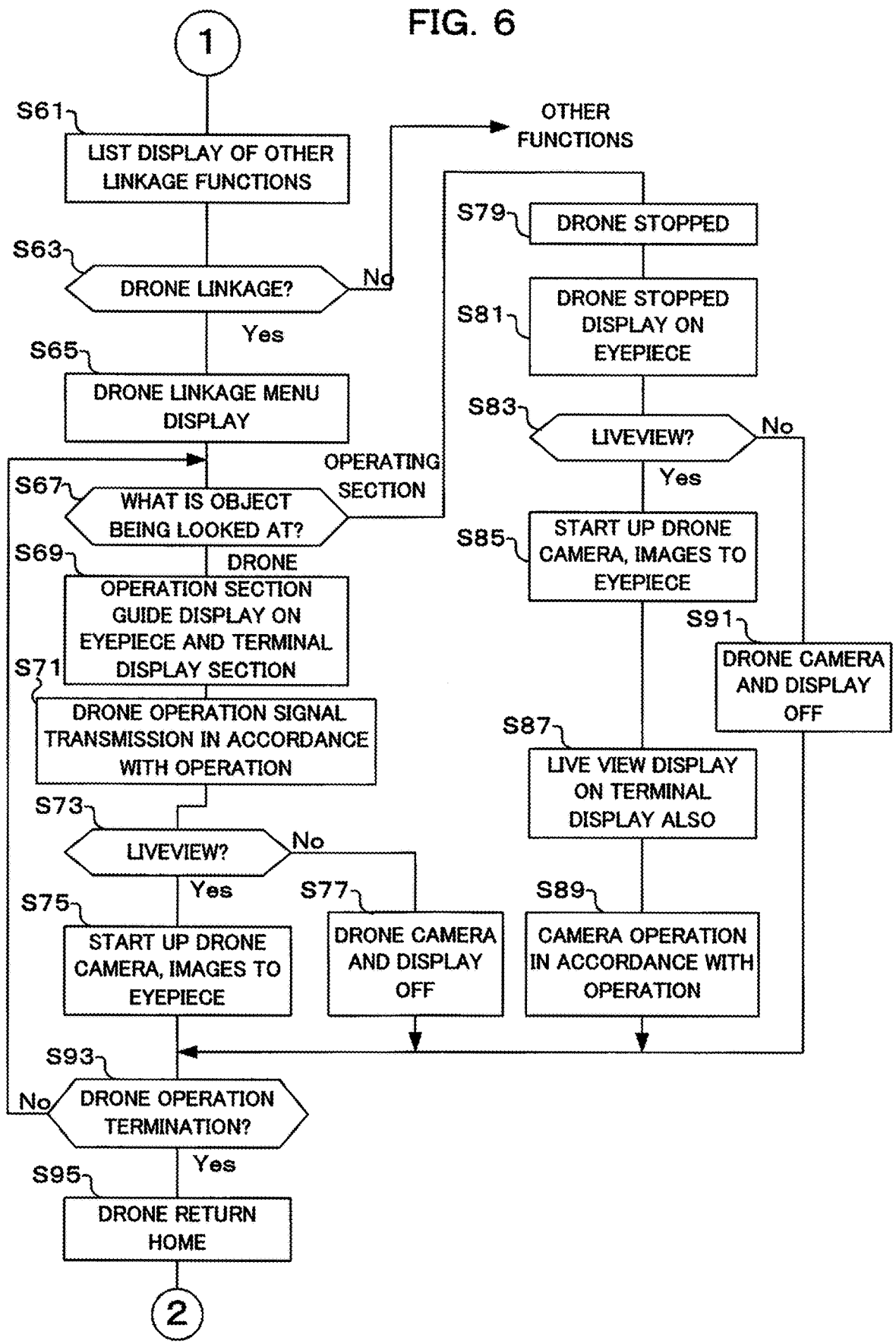
FIG. 6 is a flowchart showing operation of a mobile terminal of a first embodiment of the present invention.

The display control section 30 functions as a controller for determining an object that the user is gazing at (for example, S1 in FIG. 4A, FIG. 4B, and step S67 in FIG. 6). As was described previously, data for images, sound and movement etc. may be acquired, and this determination may be carried out based on characteristics and change characteristics etc. of this data. It is possible to further increase performance by utilizing learning that uses artificial intelligence, whereby whether or not the user is satisfied with a determination result is determined using the voice and gestures etc. of the user at the time determination results have been displayed, and accumulating results such as good or bad for each situation.

The display control section 30 also functions as a display controller that controls change in display format based on an object that has been determined, when displaying an object, that has been displayed on the second display, on the first display (refer, for example, to S3, S5 and S9 in FIG. 4). This display controller may be provided within a wearable section that is provided integrally with a display, and may also be provided at the external unit side. The display controller may also be implemented in cooperation with a control section that is provided within these units, and may also be implemented by cooperating with other units.

The above-mentioned controller may acquire posture information of the user, and perform determination based on this posture information (refer, for example, to S23, S25 and S31 in FIG. 4B). The controller may also acquire surrounding sound information, and perform determination based on this sound information that has been acquired (refer, for example, to S27 and S31 in FIG. 4B). The controller may also perform determination based on image information that has been acquired by an imaging section (refer, for example, to S29 and S31 in FIG. 4B).

The controller may also perform determination based on time variable characteristics of the user's posture, or continuation of a posture for a given time. This determination may be carried out not only with the image, sound and posture information itself that has been acquired, but also taking into consideration duration time of that information, and a process until that posture state is achieved. Learning may be done with multiple combinations. Accordingly, it may be assumed that the image input section (imaging section) and sound input section may have appropriate directivity so as to change direction in which acquisition of images and sound is possible in accordance with posture and behavior of the user. Obviously it is also possible to achieve the same functions using an image input section and sound input section that have directivity control. Specifically, at the time of directly viewing an object that is in front of the user's face, an object that can be seen transparently is desirably arranged or constructed with the possibility of being determined based on information that has been acquired.

Next, an example of use of the display system of this embodiment will be described using FIG. 2 and FIG. 3. FIG. 2 shows appearance of a user 40 with a wearable section 10 attached to their head, carrying out shooting while operating a remotely operable radio controlled aircraft (drone 50) that is capable of being remotely operated using the external unit 20. It should be noted that a smartphone is used as the external unit 20. Also, with this embodiment a drone is being used, but the invention is not limited to an aircraft, and may also be applied to a robot, equipment that is capable of moving on land (mobile equipment) or equipment capable of moving on water (mobile equipment).

It is desirable for the drone 50 to be operated visually by the user, from an observation point at which safety is secured. The user 40 therefore carries out control of the drone 50 by touch operation of a touch panel 22a that has been provided on the second display section 22 of the external unit 20, while looking at the drone 50 through the right eye optical member 41 and the left eye optical member 42 of the wearable section 10. By placing the optical sections in a transparent state, unnecessary display is done away with, and it is possible to focus effort on control.

As will be described later, if the user 40 stares at the drone 50, there is a switch to eyepiece display mode 1 for drone operation and external unit display mode 1 (refer to eyepiece display mode 1 of S3→S9→S11 in FIG. 4A). This determination as to whether or not the user 40 is gazing at the drone may be carried out using image recognition on images that have been taken by the image input section 13a of the wearable section 10. For example, if the drone 50 is in an image, it may be determined that the user 40 is gazing at the drone 50. Also, in a case where it becomes no longer possible to see the operating section (displayed on the second display section 22 of the external unit 20) in an image from a display state, it may be determined that the user 40 is gazing at the drone 50. Obviously, if it is known that the drone is being operated, what is being looked at, at the time of operation, may be inferred (gaze determination) using posture and change in posture, such as whether the user is gradually looking up or gradually looking down, or looking up into the sky.

If there has been a switch to eyepiece display mode 1 for drone operation and external unit display mode 1, then an icon 22b for forward operation of the drone 50, an icon 22c for backward operation, an icon 22d for left turn operation and an icon 22e for right turn operation are displayed on the display section 22a of the external unit 20.

Operation guide display is also carried out on the display region 12a of the right eye optical member 41 (eyepiece display). As operation guide display it is possible to display the above described icons 22b-22e, and to display images that have been photographed by the drone. With the example shown in FIG. 2, since the user 40 is performing a touch operation on the icon 22b for forward movement, the icon 22b displayed on the display region 12a is displayed so as to be distinguishable from other icons.

Also, the drone 50 is mounted with a camera 51, and movie image data that has been taken by the camera 51 is transmitted to a communication circuit of the wearable section 10 by means of the external unit 20 or directly from the drone 50. Image data from the drone 50 is displayed, together with the icons 22b-22e, on the display region 12a. In this way, observation at the drone viewpoint becomes possible, when it becomes possible to easily confirm what could not previously be seen. If operation and observation can be performed seamlessly, then it is possible for anyone to observe an object of observation that is located at a place where direct viewing is difficult, in detail, and safely. It is also possible to achieve advanced observation that combines operations that are centered on observation where exposure control and focus control etc. are carried out, and operations that are focused on safely getting close to a target object.

The display region 12a is below the right eye optical member 41, as was described above, and in a case where images from the drone 50 and the icons of the external unit 20 are not displayed on this display region 12a, the external unit 20 can be seen. As a result, display on the display region 12a is positioned superimposed on a display panel of the external unit 20, and the user 40 does not feel uneasy, such as if they were performing operations while looking directly at the external unit 20.

It should be noted that when operating so as to cause the drone 50 to rise up the external unit 20 is swung so as to be urged to the front (in the direction of arrow A in the drawing), while when operating to cause the drone 50 to drop the external unit 20 is swung so as to be urged to an opposite side (in the direction of arrow B in the drawing).

Next, FIG. 3A shows a state where an object being stared at by the user 40 has shifted from the drone 50 to the external unit 20, in order to carry out camera operation on the camera 51. If the object being stared at is replaced by the external unit 20, then as shown in FIG. 3A it is possible for the user 40 to be able to see the external unit 20 through the right eye optical member 41 and the left eye optical member 42. As will be described later, if the user 40 stares at the external unit 20 there is a switch to eyepiece display mode 2 for external unit operation and external unit display mode 2 (refer to the eyepiece display mode 1 of S3→S5→S7 in FIG. 4A).

Because the object being stared at by the user 40 is not facing the drone 50, then in order to maintain stable flight an instruction is issued from the external unit 20 to the drone 50 to stop movement and carry out hovering to remain at the same position. Also, the fact that the drone 50 is in a movement halted state is displayed on the display region 12a of the right eye optical member 41.

Together with display for carrying out camera operations, such as menus etc., an image 22f from the drone 50 is also displayed on the display panel of the external unit 20. The user 40 carries out camera operations, such as focusing, exposure adjustment, instructing still picture shooting etc. while looking at this image.

FIG. 3B shows appearance of the user 49 confirming images etc. of other people 43 that have been taken by the drone 50. In this case also, since the user 40 is in a state where they are staring at the external unit 20, display for the external unit 20 and the display region 12a is performed in eyepiece display mode 2 and external unit display mode 2.

In this way, with this embodiment display on the display region 12a of the wearable section 10 and on the external unit 20 is switched in accordance with the object being stared at by the user 40. This means that it is possible to perform required guide display on the display region 12a of the wearable section 10, and to concentrate on operation of the drone 50. Also, the external unit 20 is capable of carrying out appropriate display as an operating device of the drone 50 in accordance with the object being stared at by the user 40.

Next, operation of this embodiment will be described using the flowcharts shown in FIG. 4 to FIG. 8. The flowchart shown in FIG. 4A shows main operation of the display system constituted by the wearable section 10, external unit 20 and drone 50. This flow is executed by CPUs, respectively provided in the control section 11 within the wearable section 10, the control section 12 within the external unit 20 and the control section within the drone 50, controlling each of the sections within each unit in accordance with programs that have been stored in respective internal memories. It should be noted that operation of each unit will be described using the flowcharts shown in FIG. 5 to FIG. 8.

If the processing flow shown in FIG. 4A starts, first state determination for the glasses-type terminal is carried out (S1). Here, it is determined whether an object being stared at by the user 40 who has attached the wearable section 10, which is the glasses-type terminal, is the drone 50 or the external unit 20. Detailed operation of state determination for this glasses-type terminal will be described later using FIG. 4B, which is a typical example that is easy to describe.

If the state determination for the glasses-type terminal has been carried out in step S1, it is determined whether the objected being stared at is object 1 or object 2 (S3). Here, it is determined whether or not the object being stared at is the drone 50 (object 1) or is the external unit 20 (external unit 20 (object 2) in accordance with the determination result of step S1.

If the result of determination in S3 is object 1, namely that the object being stared at by the user is, with the example of this embodiment, the drone 50, eyepiece display mode 1 is executed (S5) and external unit display mode 1 is executed (S7). In step S5, drone operation guide display such as shown in FIG. 2 is carried out in the eyepiece, that is, on the display region 12a at the lower side of the right eye optical member 41. In step S7, display for operation of the drone 50 is carried out on the external unit 20 (with this embodiment, a smartphone). Specifically, the icons 22b-22e as shown in FIG. 2 are displayed.

On the other hand, if the determination result for step S3 is object 2, namely that the object being stared at by the user is, with the example of this embodiment, the external unit 20, eyepiece display mode 2 is executed (S9) and external unit display mode 2 is executed (S11). In step S9 display of the fact that the drone is in a stopped state, such as shown in FIG. 3A, is carried out in the eyepiece, namely, on the display region 12a at the lower side of the right eye optical member 41. Also, in Step S11, display for camera operation of the drone 50 is carried out on the external unit 20. Specifically, drone captured live view images such as shown in FIG. 3A (or taken images), and menu screens and camera operation icons etc. are displayed.

If external unit display mode 1 has been executed in step S7, or if external unit display mode 2 has been executed in step S11, processing returns to step S1.

In this manner, in the flow for display section control of the system of this embodiment, it is determined whether the user 40 is staring at object 1 (the drone 50 in this example), or is staring at object 2 (the external unit 20 with this example), and the display mode of the eyepiece (display region 12a) and the display mode of the external unit 20 (smartphone) are switched depending on the determination result. This means that on the eyepiece (display region 12a) of the wearable section 10 and on the display section of the external unit 20, display is appropriately switched corresponding to usage state of the system by the user 40.

It should be noted that with this embodiment object 1 has been made the drone 50 and object 2 has been made the external unit 20, but this is not limiting and the objects 1 and 2 can be appropriately selected in accordance with the system to which the present invention is applied.

Next, detailed operation of the glasses-type terminal state determination in step S1 will be described using the flowchart shown in FIG. 4B.

If the flow for glasses-type terminal state determination is entered, determination of communication state is first carried out (S21). Here, it is determined whether the wearable section 10 is carrying out communication with either unit. With the example shown in FIG. 2 and FIG. 3A and FIG. 3B, the wearable section 10 is capable of communication with the external unit 20, and the external unit 20 is capable of communication with the drone 50, and the other party of this communication is determined. The wearable section 10 can determined communication state between the external unit 20 and/or the drone 50 using the external unit 20, and it is possible to acquire information for these units.

Next, gaze direction determination is carried out (S23). Here, the direction in which the wearable section 10 is facing is detected using an electronic compass within the wearable section 10. Gaze elevation angle determination is also carried out (S25). Here, elevation angle at which the wearable section 10 is facing is detected using an inclination sensor, movement sensor etc. within the wearable section 10.

Next, built-in camera image determination is carried out (S27). Here, images are identified using image recognition, based on image data that has been acquired by the image input section 13a within the information acquisition section 13. Built-in microphone sound determination is also carried out (S29). Here, sounds that are in the vicinity are identified based on sound data that has been acquired by the sound input section 13b within the information acquisition section 13.

Once the above processing has been carried out, next object determination is carried out with useful information (S31). Here, the display control section 30 determines an object that is being stared at by a user who has attached the wearable section 10, based on information that has been acquired from steps S21 and S29. For example, in a case where a result of elevation angle determination is looking up into the sky, a result of camera image determination is a drone video, and a result of microphone sound determination is that a propeller sound is being emitted, it is determined that the object being stared at is object 1 (drone). On the other hand, if the result of elevation angle determination is looking down on water, and a result of camera image determination is an external unit video, it is determined that the object being stared at is object 2 (external unit 20). This determination has been carried out by the display control section 30, but may also be carried out by either the control section 11 within the wearable section 10 or the control section 21 within the external unit 20 alone, or may be carried out by the two control sections acting in cooperation with each other.

Once object determination has been carried out in step S31, it is next determined whether or not the object being stared at is object 1 (S33). If the result of determination in step S31 is that the object being stared at is object 1, "object 1" (S35) is set, while if the object being stared at is object 2, "object 2" (S37) is set.

In this way, in the flow for glasses-type terminal state determination, the state of each unit is determined, and based on the result of this determination it is determined whether the user 40 who has attached the wearable section 10 is staring at object 1 (here, the drone 50), or is staring at object 2 (here, the smartphone). It should be noted that determination in this flow is based on information for steps S21-S29, but as this determination information some steps may be omitted, and other information may also be acquired. Determination information may be appropriately selected in accordance with the system to which the present invention is applied.

It should be noted that in the flow shown in FIG. 4, in order to make description easier description has been given emphasizing stationary situational judgment for each state, but as described previously judgment may be respectively based on given time continuation and a variety of characteristics etc. It is possible to gain increased accuracy and satisfaction with determination through transition patterns or multiple decisions, and further, decisions may be by allowing learning of various parameters and images using artificial intelligence.

Figure 5:
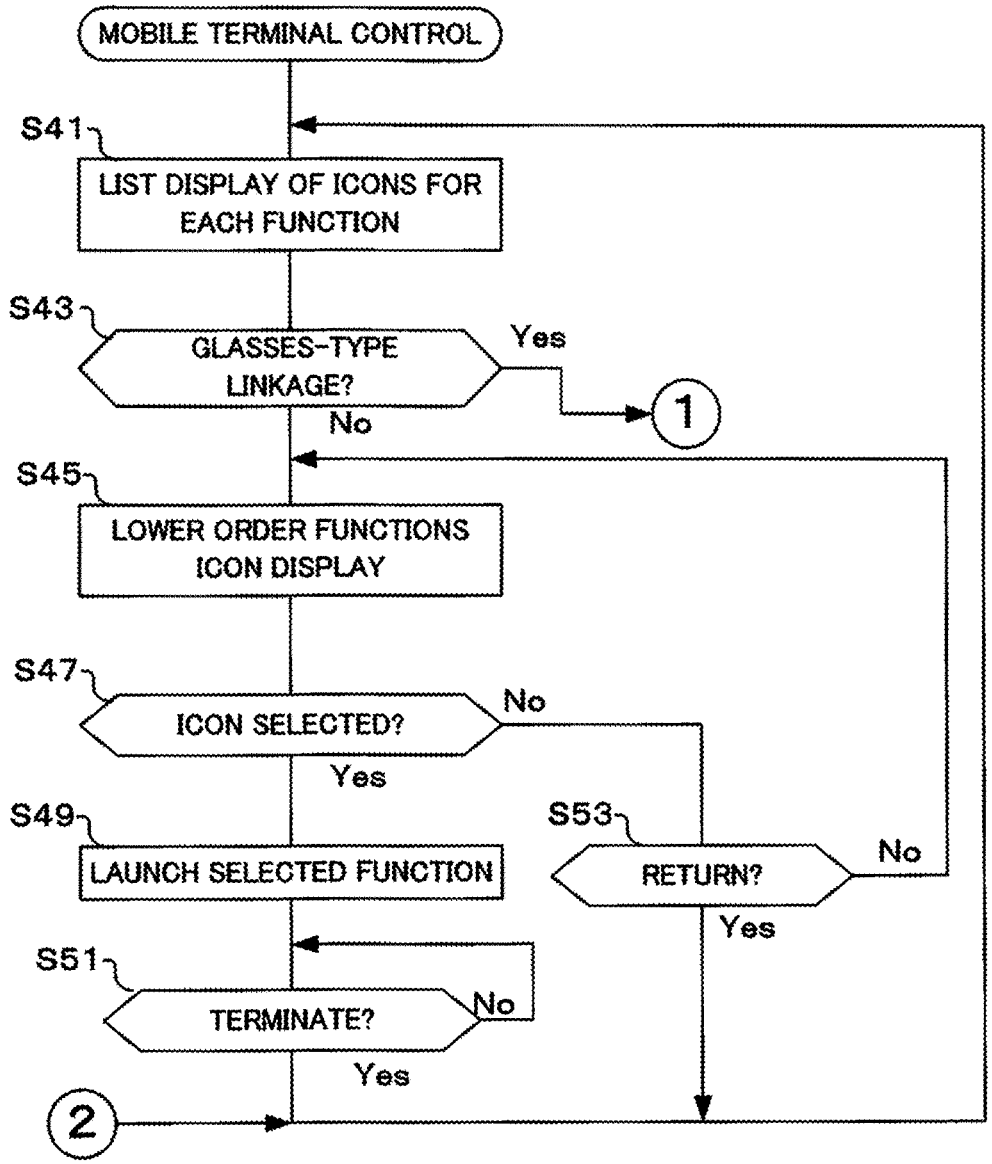
FIG. 5 is a flowchart showing operation of mobile terminal control of an information display device of a first embodiment of the present invention.

Next, operation of each unit will be described using the flowcharts shown in FIG. 5 to FIG. 8. The flowchart shown FIG. 5 shows operation of the external unit 20. This flow is executed by the CPU in the control section 21 of the external unit 20 controlling each section within the external unit 20 in accordance with programs that have been stored in internal memory.

If the flow for mobile terminal control started, first, list display of functional order icons is carried out (S41). Here, icons for functions that can be executed by the external unit 20 are displayed in a list format on the second display section 22. As a function displayed here there is "glasses-type linkage". Glasses-type linkage is a mode of changing display format in accordance with state of a smartphone (external unit 20) used by the user 40, as was described using FIG. 2 and FIG. 3. It should be noted that for functions other than glasses-type linkage also, display of a mode that links to another external unit, such as, for example, microscope link, endoscope link, etc. may also be performed.

Next, it is determined whether or not glasses-type linkage has been selected (S43). In a case where the user 40 wishes to select glasses-type linkage, it is possible to select glasses-type linkage by moving a cursor using an operation member, or by a touch operation etc. In this step determination is based on operating state of the user 40.

If the result of determination in step S43 is not glasses-type linkage, icons for lower order functions are displayed (S45). Here, for a function corresponding to an icon that was selected by the user 40, among the icons and that were displayed in step S41, icons for lower order functions are displayed on the second display section 22.

Next it is determined whether or not an icon has been selected (S47). Here it is determined whether or not the user 40 has selected from among the icons that were displayed in S47. If the result of determination is that an icon has been selected, a selection function is launched (S49). It is then determined whether or not there is termination (S51). Here it is determined whether or not the function that has been selected has been terminated. If the result of this determination is that the function has not been terminated the selected function is executed.

If the result of determination in step S47 is that an icon has not been selected, it is determined whether or not to return (S53). An icon or operation member for returning to the initial state (position) is provided on the external unit 20. In this step, determination is based on whether this icon has been touched, or the operation member has been operated. If the result of this determination is that return has not been selected, processing returns to step S45, and lower order function icons are displayed.

If the result of determination in step S53 is that return has been selected, or if the result of determination in step S51 is that the function has been terminated, processing returns to S41.

Processing returns to previously described step S43, and if the result of determination in this step is glasses-type linkage, list display of other linkage functions is carried out (S61 in FIG. 6). Here, the drone 50 which is a unit to be linked in the glasses-type linkage, and modes of linking with other external units besides the drone 50, such as, for example, microscope linkage, endoscope linkage, etc. are displayed.

Next, it is determined whether or not there is drone linkage (S63). In a case where the user 40 wishes to select drone linkage, it is possible to select drone linkage by moving a cursor using an operation member, or by a touch operation etc. In this step determination is based operation carried out by the user 40 on the external unit 20. If the result of this determination is that the user has selected linkage to other than the drone, another function is executed.

If the result of determination in step S63 is that drone linkage has been selected, next a menu for drone linkage displayed (S65). Here, various menus are displayed on the second display section 22. For example, in a case where there are a plurality of drones, menus for various settings, such as which drone to link to and a communication system between the external unit 20 and the drone 50, initial settings of a camera mounted on the drone 50, initial settings of the drone 50 itself etc. are displayed. If any menu item is selected execution is performed in line with the selected item.

It is next determined whether or not the subject of observation is the operating section or the drone (S67). Here it is determined, based on the glasses-type terminal state determination etc. that was described in FIG. 4B, and whether the object being stared at by the user 40 is the drone 50, or is the external unit 20 (smartphone) that has an operation section. With this embodiment, this determination is carried out by the display control section 30. The control section 21 of the external unit 20 within the display control section 30 carries out the determination independently. Besides this approach, a determination may be carried out by the external unit 20 and the wearable section 10 acting in cooperation, and a result that has been determined may be received by the wearable section 10.

If the result of determination in step S67 is that the subject of observation is the drone, operation section guide display is displayed on the eyepiece and the terminal display section (S69). Here, as was described using FIG. 2, the user 40 is in the state of staring at the drone 50. Therefore, display is carried out on the display region 12a of the wearable section 10 and on the external unit 20 (smartphone), so that the user 40 can concentrate on operation of the drone 50. Specifically, a signal is transmitted to the wearable section 10 so as to display operation icons 22b-22e on the display region 12a of the wearable section 10. Also, the operation icons 22b-22e are displayed enlarged on the second display section 22 of the external unit 20, and it is easy for the user 40 to perform operations using a touch operation even when groping around in conditions where they are not looking at the screen.

Next, drone operation signals are transmitted in accordance with operations (S71). Here, operation signals for moving the drone 50 forwards, backwards, turning laterally, moving upwards or moving downwards etc. are transmitted to the drone 50, based on touch state of the icons 22b-22e and how the external unit 20 is moved by the user (refer to S95 in FIG. 7).

It is next determined whether or not to carry out live view (S73). Then may be cases where the user 40 wishes to carry out operation of the drone 50 while looking at images from the camera 51 that is mounted on the drone 50. On the other hand the power supply of the wearable section 10 is often small, and in cases where it is desired to prevent power supply consumption the user 40 will not want image display from the camera 51. Icons or operating sections for live view display are provided so that it is possible for the user 40 to select whether or not to carry out live view display, and so in this step it is determined whether or not to carry out live view based on the operating states of these icons or operating sections.

If the result of determination in step S73 is live view, then the camera 51 of the drone 50 is started up, and images are displayed on the eyepiece (display region 12a) (S75). Live view display is carried out on the display region 12a, as shown in FIG. 3A (refer to S99 in FIG. 7, which will be described later).

On the other hand, if the result of determination in step S73 is to not carry out live view, the drone camera is turned off and display is also turned off (S77). Here, in order to prevent power supply consumption, the camera that is mounted on the drone 50 is turned off, and display of the display region 12*a* of the wearable section 10 is also turned off.

Returning to S67, if the result of determination in this step is that the subject of observation is the operating section, the drone is stopped (S79). As was described previously, when operating the drone 50, from the viewpoint of maintaining safety it is desirable for the user 40 to carry out operations in a state of looking directly at the drone 50. For this reason, it is not desirable fly the drone 50 in a state where the user 40 is looking at the operation screen (icons 22*b*-22*e* etc.) of the second display section 22 of the external unit 20 (smartphone). With this embodiment, therefore, in a case where the subject of observation is the operating section, the external unit 20 instructs the drone 50 to enter a state of being stopped overhead, that is, to perform hovering.

Next, drone stopped display is carried out on the eyepiece (S81). The user 40 observes the operating section through the optical member 41 and the optical member 42 of the wearable section 10. Therefore, there is instruction by means of communication so as to display the fact that the drone is in a stopped state on the display region 12*a* of the wearable section 10, as shown in FIG. 3A.

Once the drone stop display has been carried out, it is next determined whether or not to carry out live view (S83). Here, similarly to step S73, the user 40 selects whether or not to carry out live view display, and so determination is based on this selection result.

If the result of determination in step S83 is live view, then the camera of the drone 50 is started up, and images are displayed on the eyepiece (display region 12*a*) (S85). Here, similarly to S75, live view is carried out on the display region 12*a*, as shown in FIG. 3A (refer, to S99 in FIG. 7, which will be described later).

Next, live view is also carried out on the terminal display section (S87). Here, live view display is also carried out on the second display section 22 of the external unit 20. Because the user 40 is looking at the second display section 22 of the external unit 20, live view display is also carried out on this display section, and it is possible to confirm the state of the drone 50.

Next, camera control is carried out in accordance with operations (S89). Menu screens for operation of the camera 51, and various icons, such as shooting instruction for still pictures and movies, focusing instruction, exposure correction instruction, optical filter insertion instruction, image processing instruction etc. are displayed on the second display section 22 of the external unit 20. In this step camera operation is carried out in accordance with such operations etc. by the user 40 (refer to S103 in FIG. 7, which will described later). It should be noted that besides icons, operating members for camera operation may be provided, and camera control carried out in accordance with operating states of these operating members.

Returning to step S83, if the result of determination in this step is to not carry out live view, the drone camera is turned off and display is also turned off (S91). Here, in order to prevent power supply consumption, the camera that is mounted on the drone 50 is turned off, and display of the display region 12*a* of the wearable section 10 is also turned off.

If the respective processing has been executed in steps S75, S77, S89, and S91, it is next determined whether or not to terminate drone operation (S93). In the event that the user 40 terminates operation of the drone 50, a terminate icon or terminate operation member etc. is operated. In this step determination is in accordance with these operations. If the result of determination in step S93 is that drone operation will not be terminated, step S67 is returned to.

On the other hand, if the result of determination in step S93 is termination of drone operation, the drone is caused to return home (S95). Here control is carried out so as to return home, such that the drone 50 returns safely to where the user 40 is (refer to S95 in FIG. 7, which will be described later). Once the drone 50 returns home, step S41 is returned to.

In this way, in the flow for mobile terminal control, if glasses-type linkage or drone linkage are selected (refer to S43 and S63), display on the display region 12*a* of the wearable section 10 and on the second display section 22 of the external unit 20 is switched in accordance with a subject of observation, namely whether the user 40 is staring at the drone 50 or is staring at the external unit 20 (S69, S81). As a result, appropriate display is performed in accordance with the object being stared at by the user. Also, since the wearable section 10 is linked to the external unit 20, information possessed by the external unit 20, for example, operating process and history information of the drone 50 can be utilized, making comprehensive judgment possible. Further, there is linkage to external devices and databases by means of the external unit 20, and it is possible to utilize artificial intelligence.

It should be noted that this flow is carrying out control of the drone 50 with the mobile terminal (smartphone). However, this is not limiting, and it is also possible to carry out control using a dedicated controller. In this case also, control of the drone 59 may be carried out using the glasses-type terminal (wearable section). Also, in the flow shown in FIG. 5 and FIG. 6, in order to make description easier description has been given emphasizing situational determination for each state, but as described previously determination may be respectively based on given time continuation and a variety of characteristics etc. It is possible to gain increased accuracy and satisfaction with determination through transition patterns or multiple decisions, and further, decisions may be by allowing learning of various parameters and images using artificial intelligence.

Figure 7:
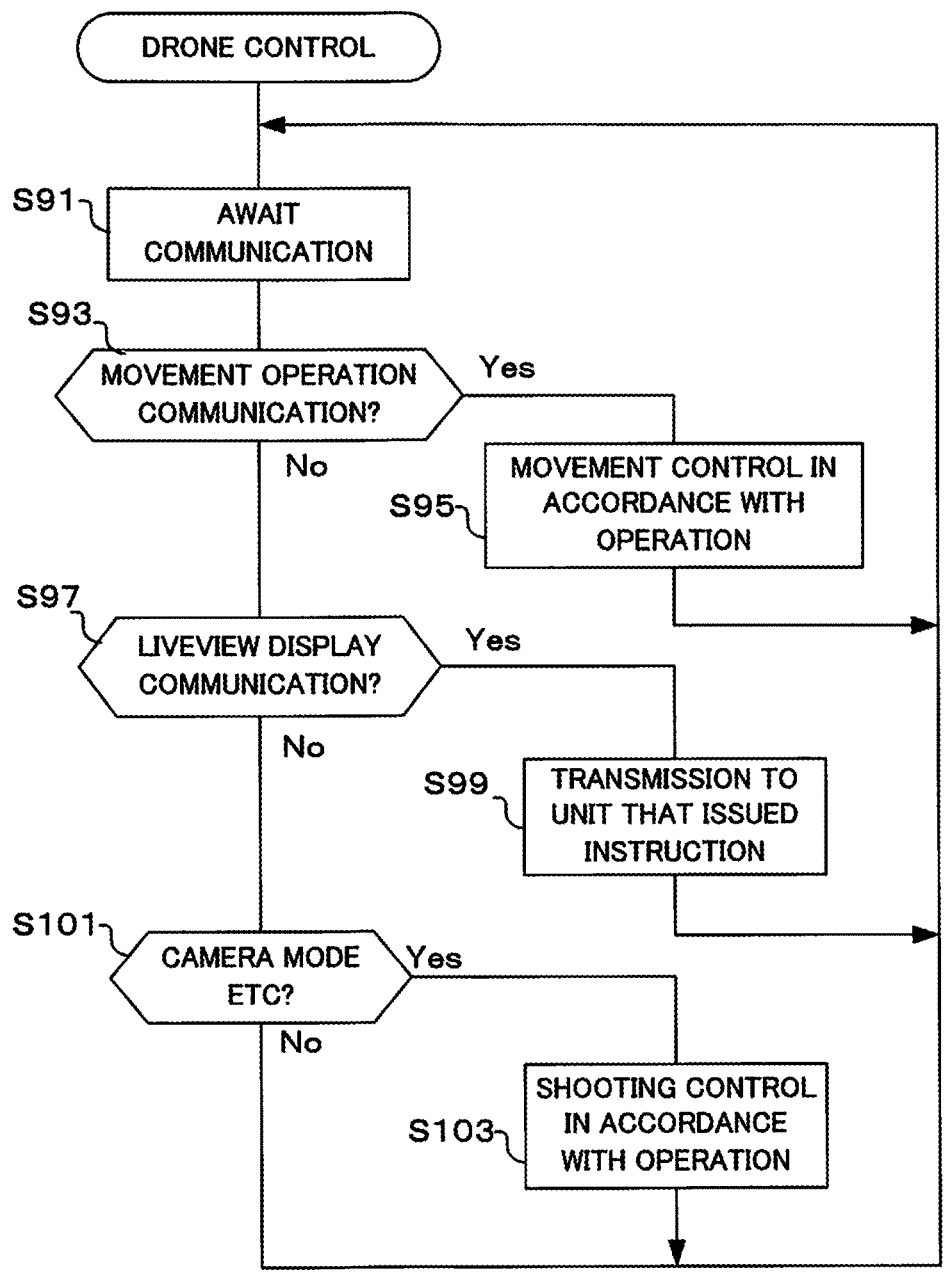
FIG. 7 is a flowchart showing operation of a drone of a first embodiment of the present invention.

Next, operation of the drone 50 will be described using the flowchart shown in FIG. 7. This flow is executed by the CPU in the control section of the drone 50 controlling each section within the drone 50 in accordance with programs that have been stored in internal memory.

If the flow for drone control is started, first communication is awaited (S91). With this embodiment, the external unit 20 has a role as an operation unit for the drone 50, and the drone 50 operates on the basis of control signals from the external unit 20. In this step transmission of signals from the external unit 20 to the drone 50 is awaited. If there is communication, steps S93 and after are executed.

Next, it is determined whether or not it is movement operation communication (S93). In a case where the user 40 is staring at the drone 50, drone operation signals will be transmitted from the external unit 20 (refer to S71 in FIG. 6). In this step it is determined whether or not communication from the external unit 20 is communication for movement operation.

If the result of determination in step S93 is that it is movement operation communication, movement control in accordance with operation is carried out (S95). Here, control such as moving forwards, moving backwards, left turn, right turn, going up, going down and hovering etc. are carried out in accordance with instructions from the external unit 20. Also, in the event that a return home instruction is issued from the external unit 20, the drone returns to the original position of the user 40.

If the result of determination in step S93 is that it is not movement operation communication, it is determined whether or not it is live view communication (S97). As was described previously, in a case where the user 40 wishes to confirm live view images that have been taken by the camera section of the drone 50, the drone camera is started up and an instruction is issued so as to transmit images. In this step determination is based on whether or not this instruction has been received.

If the result of determination in step S97 is that it is live view communication, images are sent to the unit designated for transmission (S99). Here, the camera 51 that is mounted on the drone 50 is started up, and image data that has been acquired by this camera 51 is transmitted to the unit that issued the instruction. As the units to be designated, there is the wearable section 10 and/or the external unit 20, and other units may also be designated for transmission.

If the result of determination in step S97 is that it is not live view communication, it is next determined whether or not there is camera etc. (S101). In a case where the user 40 carries out operation of the camera 51 that has been mounted on the drone 50, operating instructions are transmitted (refer to S89 in FIG. 6). In this step, it is determined whether or not such an instruction has been issued.

If the result of determination in step S101 is camera mode etc., shooting control in accordance with operation is carried out (S103). Here, shooting control is carried out in accordance with instructions from the external unit 20.

If the result of determination in step S101 is not camera mode etc., and if processing of steps S95, S99 and S103 has been executed, processing returns to step S91.

In this way, in the drone control flow of this embodiment, control of the drone 50 is carried out in accordance with commands that have been instructed by communication through the external unit 20 by the user 40. In the drone 50 also, in a case where it is desired to prevent power supply consumption, shooting operations and transmission of taken images etc. may be restricted. Also, in the flow shown in FIG. 7, in order to make description easier description has been given emphasizing stationary state-like situational determination for each state, but as described previously determination may be respectively based on given time continuation and a variety of characteristics etc. It is possible to gain increased accuracy and satisfaction with determination through transition patterns or multiple decisions, and further, decisions may be by allowing learning of various parameters and images using artificial intelligence.

Next, operation of the glasses-type terminal (wearable section 10) will be described using the flowchart shown FIG. 8. This flow is executed by the CPU in the control section 11 of the wearable section 10 controlling each section within the wearable section 10 in accordance with programs that have been stored in internal memory.

If the flow for glasses-type terminal control is started, first, communication is awaited (S111). With this embodiment, the wearable section 10 is operated on the basis of communication from the external unit 20. In this step transmission of signals from the external unit 20 to the wearable section 100 is awaited.

It is next determined whether or not there is communication (S113). As was described previously, as a communication system any one or a plurality of wireless communication, such as Wi-Fi or Bluetooth (registered trademark), or infrared communication is used. In this step it is determined whether or not there has been access from the external unit 20 using either communications system.

If the result of determination in step S113 is that there is communication, each sensor is turned on (S115). As was described earlier, with this embodiment, the wearable section 10 has various sensors such as an electronic compass for gaze direction detection, a sensor for gaze elevation angle detection, a built-in camera, a built-in microphone etc. (refer to FIG. 4B), and operation of these sensors is commenced.

If the various senses have been turned on, next determination of an object being stared at is carried out (S117). Here, determination of the object being stared at is carried out based on the flow of FIG. 4B etc., using detection outputs of the various sensors whose operation was started step S115.

If determination of object being stared at has been carried out, next the determination result is transmitted (S119). Here, the determination result of the object being stared at of step S117 is transmitted to the external unit 20 by means of a communication circuit. The external unit 20 carries out determination of object being stared at based on this detection result, and based on this determination result switching of display is carried out (refer to S69 and S81 in FIG. 6).

Next, it is determined whether or not it is command communication (S121). Here it determined whether or not a command has been transmitted from the external unit 20 (smartphone) to the glasses-type terminal top If the result of determination in step S121 is that a command has been transmitted, control (display) in line with the command is carried out (S123). As was described previously, since the external unit 20 transmits commands for display control to the wearable section 10 (S69, S75, S77, S81, S85, S87 etc. in FIG. 6), control is carried out in accordance with these commands. For example, as was described previously, in the case where it is desired to prevent power consumption of the wearable section 10, a command to turn live view display off is transmitted. In this case, live view display is not carried out on the wearable section 10.

If control in line with the command has been carried out step S123, or if the result of determination in step S121 was not command communication, or if the result of determination in step S113 was not communication, step S111 is returned to.

In this way, in the flow for the glasses-type terminal, display is carried out in accordance with commands from the external unit 20 (refer to S123). As a result appropriate display in accordance with conditions at the glasses-type terminal and the external unit becomes possible. It is also possible to prevent power supply consumption by turning live view display off.

Figure 8:
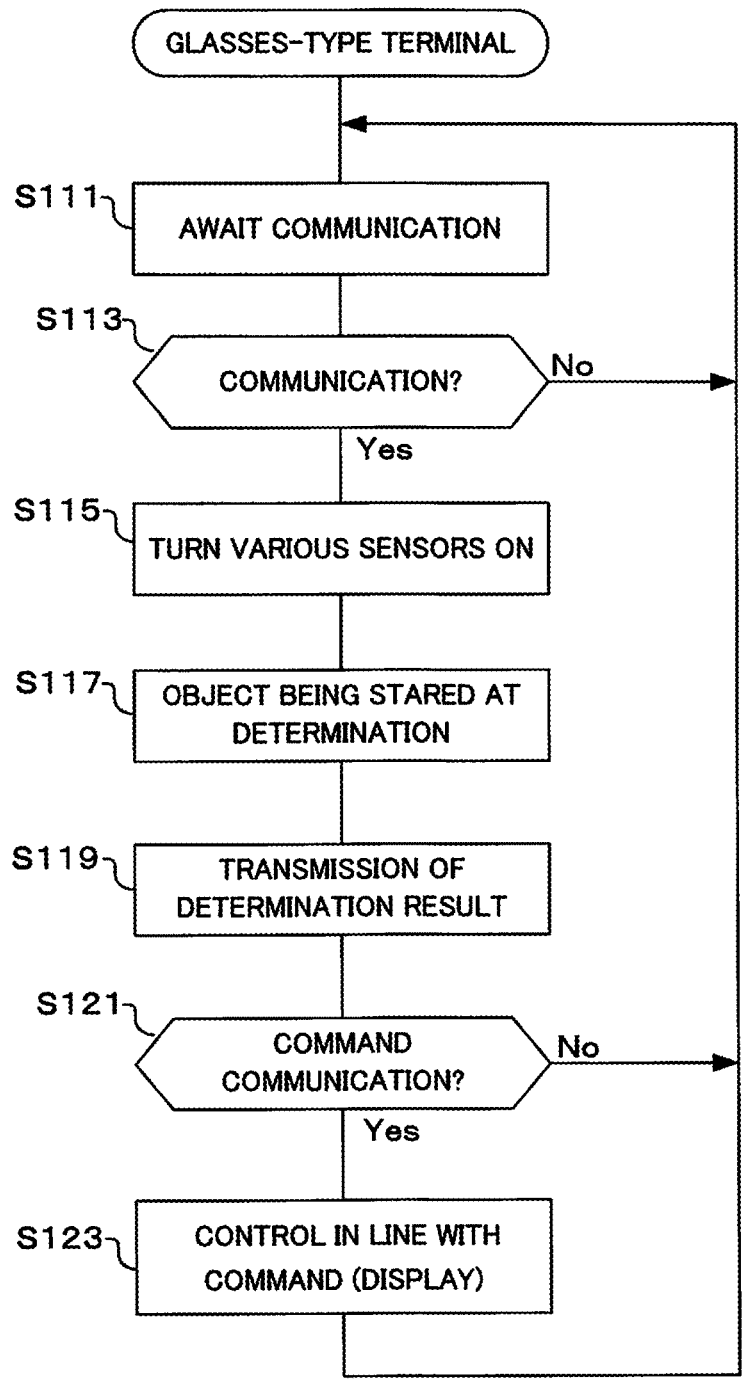
FIG. 8 is a flowchart showing operation of a glasses-type terminal of a first embodiment of the present invention.

It should be noted that in the flow shown in FIG. 8, in order to make description easier description has been given emphasizing stationary state-like situational determination for each state, but as described previously determination may be respectively based on given time continuation and a variety of characteristics etc. It is possible to gain increased accuracy and satisfaction with determination through transition patterns or multiple decisions, and further, decisions may be by allowing learning of various parameters and images using artificial intelligence.

As has been described above, the first embodiment of the present invention is a system comprising the wearable section 10 applied to a glasses-type terminal, the external unit 20 applied to a smartphone, and the drone 50, and operation is made easy by making content that is displayed on the wearable section 10 and the external unit 20 different, depending on the object being stared at by the user 40.

Next, a second embodiment of the present invention will be described using FIG. 9A to FIG. 11. With the second embodiment, when a doctor 44 who has attached the wearable section 10 examines a patient, it is possible to display various information on a display section.

Regarding the structure of this embodiment, the wearable section 10 of FIG. 1A is worn by a doctor 44, with a personal computer (PC) 60 being used as the external unit 20, and the main structure of these components is the same as in the first embodiment. It should be noted that a display panel of a personal computer is suitable for the second display section 22 of the external unit 20, and the second display section 22 has a control section 21 and an information acquisition section 23.

As the information acquisition section 23 there are a keyboard, touch panel, microphone etc. As a peripheral circuit of the control section 21 there is a communication circuit for carrying out communication with the wearable section 10. The personal computer 60 may be a stand-alone computer, but with this embodiment will be described as a hospital terminal connected to a LAN (local area network) within a hospital.

Next, a method of using the wearable section 10 and personal computer 60 of this embodiment will be described using FIG. 9A-FIG. 9C.

FIG. 9A shows the appearance of a doctor 44 who has attached the wearable section 10 examining a patient 45. In this state, the doctor 44 who has attached the wearable section 10 is staring at the patient 45. Images that have been acquired by the image input section 13a provided in the wearable section 10 are only displayed on a display area 12a of the first display section 12 of the wearable section 10, without being displayed on a display monitor of the personal computer 60. Also, live view images at this time are transmitted to the personal computer 60 and stored in memory within the personal computer 60.

FIG. 9B shows the appearance when the doctor 44 is explaining symptoms (result of diagnosis) to the patient 45. In this state, the doctor 44 who has attached the wearable section 10 is staring at the display monitor of the personal computer 60. The display region 12a of the wearable section 10 is turned off, and images of the patient that have been stored in memory are displayed on the display monitor of the personal computer 60.

FIG. 9C shows a modified example of display on the display panel of the personal computer 60. Specifically, with the example shown in FIG. 9B if the doctor 44 stares at the patient 45, affected parts of the patient 45 are automatically displayed on the display panel of the personal computer 60. By contrast, with the modified example shown in FIG. 9C, the patient 45 asks "let me see", and if in reply to this the doctor 44 answers "yes", that is, if permission is granted in conversation, affected parts of the patient 45 are displayed on the display panel of the personal computer 60. As a result, the personal computer 60 performs determination by carrying out speech recognition using speech data that has been collected by a microphone. If display is performed on the display panel of the personal computer 60, display for the display region 12a of the wearable section 10 may be turned off.

It should be noted that affected parts of the patient 45 may be displayed in parallel on the display region 12a, as shown in FIG. 9C. In this case previously taken and stored images are displayed for the purpose of comparison with images that have been taken during the current diagnosis. In FIG. 9C, after permitting display by conversation, displaying two images in parallel on the display panel of the personal computer 60 is for the purpose of comparing previous and current images.

Next, operation of the personal computer 60 will be described using the flowchart shown in FIG. 10. This flow is performed by a CPU of a control section within the personal computer 60 controlling each section within the personal computer 60 in accordance with programs that have been stored in an internal memory.

Figure 10:
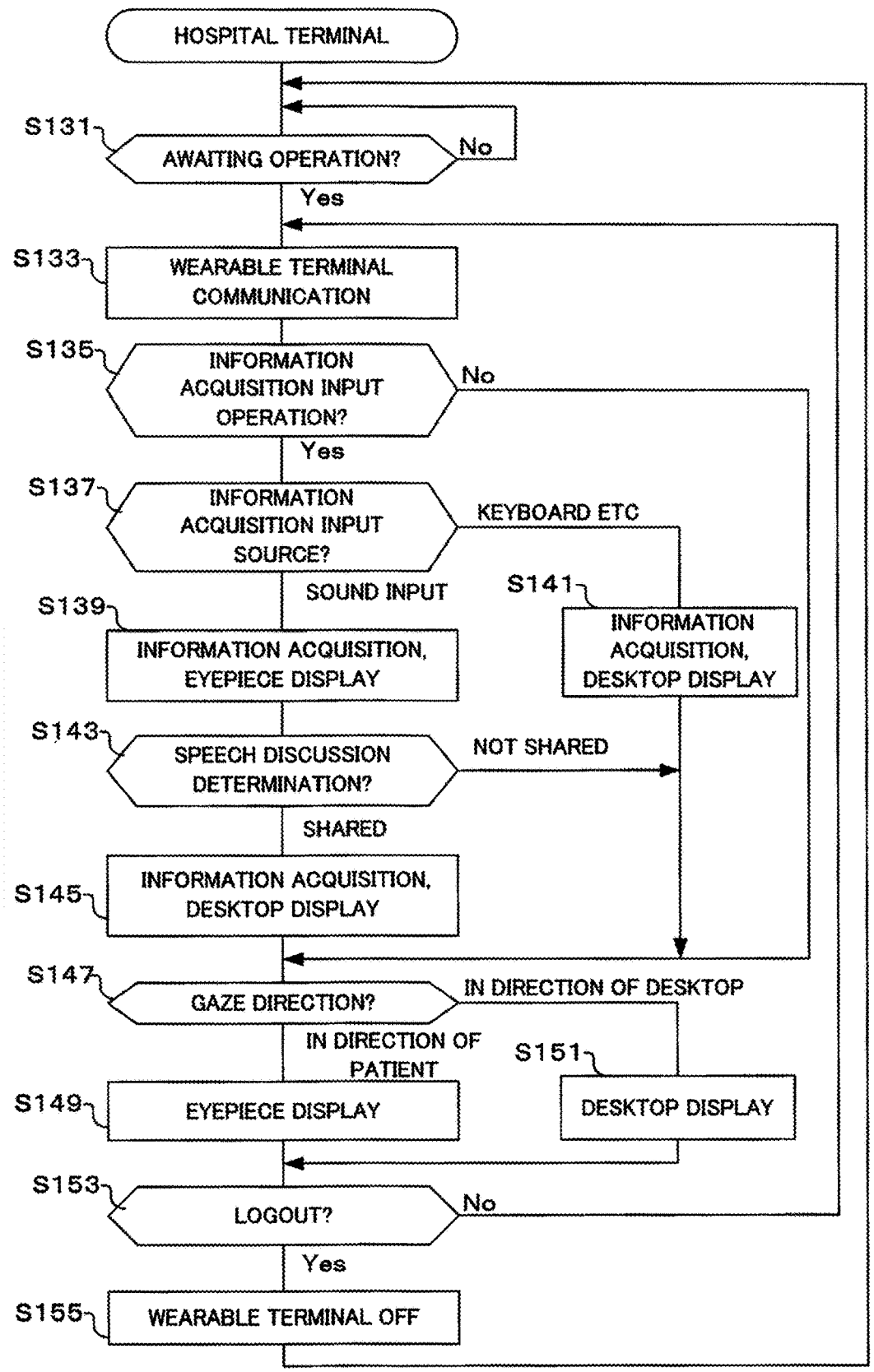
FIG. 10 is a flowchart showing operation of an in-hospital terminal of a second embodiment of the present invention.

If the flow for the hospital terminal shown in FIG. 10 is started, first, operation is awaited (S131). For example, it is determined whether or not various operations have been performed, such as with a mouse, a keyboard, or a barcode reader, and if there are none of these operations a standby state is entered. If the result of determination in step S131 is that operation has been detected, terminal communication with the wearable section 10 is carried out (S133). Here, wireless communication is carried out between the personal computer 60 and the wearable section 10 (refer to S161 in FIG. 11, which will described later).

If wearable terminal communication has been carried out, it is next determined whether or not an input operation for the purpose of information acquisition has been performed (S135). As input operations for the purpose of information acquisition, there are keyboard input, and sound input using a microphone etc. In this step it is determined whether or not any information input has been performed.

If the result of determination in step S135 is that an information input operation has been performed, it is next determined what was the input source for information acquisition (S137). Here it is determined whether the information input source is a keyboard etc., or is speech input. It should be noted that when determining the input source for information acquisition, information of the wearable section 10 may also be used (refer to S163 and S165 in FIG. 11, which will be described later).

If the result of determination in step S137 is sound input, information is acquired and eyepiece display is carried out (S139). Here, sound data is input from a microphone, and a patient is specified, for example, based on this input. For example, when the doctor 44 designates the patient's name etc. speech recognition is carried out. Display of information that has been acquired is carried out on the display region 12a of the wearable section 10. For example, in a case where a patient has been specified, the patient's identity etc. displayed.

Next, speech discussion determination is carried out (S143). Here, content of a conversation between the doctor 44 and the patient 45 is determined based on sound data that has been input from the microphone. For example, determination is carried out based on conversation such as was shown in FIG. 9C. It should be noted that this recognition of conversation content (speech recognition) may be carried out by the personal computer 60, or may be carried out by a server in the hospital, and further, an external server may be connected to and the speech recognition carried out using this external server.

If the result of determination in step S143 is that content discussed in speech could be determined (if it has been shared), information acquisition is performed and desktop display is carried out (S145). Here, information corresponding to the results of speech discussion is required, and this information that has been acquired is displayed on the display panel of the personal computer.

Returning to step S137, if the result of determination in this step is that there is an input source such as a keyboard, information is acquired and desktop display is carried out (S141). Here, information that has been acquired by the keyboard etc. is displayed on the display panel of the personal computer 60.

If information has been acquired and desktop display carried out step S141 or step S145, or if the result of determination in step S143 is that the result of speech discussion has not been shared, or if an information acquisition input has not been performed in step S135, determination of gaze direction is carried out (S147). Here it is determined whether the doctor 44 is facing towards the patient 45, or if the doctor 44 is facing towards the display panel of the personal computer 60. As a determination method for gaze direction, determination may be based on conditions shown in the flowchart of FIG. 4B or the like. It should be noted that when determining gaze direction, information of the wearable section 10 may also be used (refer to S163 and S165 in FIG. 11, which will be described later).

If the result of determination in step S147 is that the gaze direction of the doctor 44 is in the direction of the patient 45, eyepiece display is carried out (S149). Here, an image that was acquired by the image input section 13a of the wearable section 10 is displayed on the display region 12a of the wearable section 10, as shown in FIG. 9A.

On the other hand, if the result of determination in step S147 is that the doctor 44 is facing towards the display panel of the personal computer 60, desktop display is carried out (S151). Here, display on the display region 12a of the wearable section 10 is turned off, and display of affected parts of the patient 45 etc., and information that is helpful in describing the result of diagnosis to the patient, is carried out display panel of the personal computer 60.

If display has been carried out in step S149 or step S151, it is next determined whether or not the user has logged out (S153). Here, is determined whether or not logout processing has been performed on the personal computer 60. If the result of this determination is that logout processing has not been performed, processing returns to step S133.

On the other hand, if the result of determination in step S153 is that logout processing has been performed, the wearable terminal is turned off (S155). If off processing has been performed for the wearable section 10 (S177 in FIG. 11) this fact is communicated, and determination is based on this communication. If the wearable terminal has been turned off, step S131 is returned to.

In this way, in the hospital terminal flow, the wearable section 10 can process information and appropriately switch display while carrying out communication with a hospital terminal such as a PC or the like. It should be noted that with this embodiment the determination as to whether or not there will be live view, in steps S73 and S83 in FIG. 6, is not carried out. However, similarly to the first embodiment, live view display may be turned on or off in order to prevent power supply consumption in the wearable section 10. Also, the hospital terminal may be connected to a hospital server or an external server, and may carry out external processing such as speech recognition and image recognition together with acquiring various information. By making external linkage possible, various operations are made simple.

Next, operation of the wearable section 10 of this embodiment will be described using the flowchart shown in FIG. 11. This flow is executed by the CPU in the control section 11 of the wearable section 10 controlling each section within the wearable section 10 in accordance with programs that have been stored in internal memory.

If the flow for the wearable section shown in FIG. 11 started, first, communication is awaited (S161). The hospital terminal (personal computer 60) carries out communication with the wearable section 10 in step S133, and so this communication is awaited.

If the result of determination in step S161 is that there is communication, various input sections are started up (S163). Here, various input sections such as the image input section 13a and the sound input section 13b within the wearable section 10 are started up.

If the various intersections have been started up, next various input results are transmitted (S165). Here, information that has been acquired by the input sections that were started up in step S163 is transmitted to the hospital terminal (personal computer 60). It should be noted that when transmitting information, it may not be that data directly.

If transmission of various input results has been carried out, it is next determined whether the eyepiece (display region 12a) is capable of display (S167). In accordance with the previously described determination result for input source for information acquisition, in step S139 display is possible on the eyepiece, while on the other hand in step S141 display is not carried out on the eyepiece. Also, depending on the gaze direction of the doctor 44, display is possible on the eyepiece at step S149, but display is not carried out on the eyepiece S151. In this step, determination as to whether or not the eyepiece is capable of display is based on instruction from the hospital terminal.

If the result of determination in step S167 is that eyepiece display is possible, eyepiece display is carried out (S171). Here, display such as shown in FIG. 9A, for example, is carried out on the display region 12a. On the other hand, if the result of determination is that eyepiece display is not possible, eyepiece display is turned off (S169). Here, display on the display region 12a is turned off as shown, for example, in FIG. 9B. It should be noted that as long as it is not inconvenient display may be maintained as it is. By turning display off, it is possible to prevent power supply consumption in the wearable section 10.

If eyepiece display has been carried out in step S171, next it is determined whether or not a shooting instruction or cancellation has been performed (S173). If a shooting instruction is issued, still picture shooting based on image data that has been acquired by the image input section 13a is instructed, and images are displayed until the shooting is cancelled. Here it is determined whether or not this shooting instruction or cancellation has been carried out. Also, in the case of a movie, it is determined whether commencement of movie shooting has been instructed or completion of movie shooting has been instructed.

If the result of determination in step S173 is that shooting instruction or cancellation has been issued storage or cancellation of shooting results is carried out (S175). Here, display of a still image (freeze) and commencement and completion of movie storage are carried out based on the result of determination in step S173. It should be noted that storage of image data that has been acquired by the image input section 13a is transmitted to the personal computer 60 and carried out in the personal computer 60, but storage may also be carried out by the wearable section 10. If shooting results have been canceled, normal live view display is returned to.

If saving or cancellation of shooting results has been performed in step S175, or if eyepiece display has been turned off in step S169, or if the result of determination in step S173 is that there was not instruction or cancellation of shooting, it is next determined whether or not there is terminal off information (S177). As was described previously, if turning off of the wearable terminal is carried out in step S155 during operation of the hospital terminal, this is notified by means of communication. In this step determination is based on whether or not there is this notification. If the result of this determination is that there is no terminal off information, processing returns to step S161.

If the result of determination in step S177 is that there is terminal off information, various input sections are turned off (S179). Here, the various input devices that were started up in step S163 are turned off. Once the various input devices have been turned off, processing returns to step S161.

In this way, with the second embodiment of the present invention, in the case where the doctor 44 is staring at the patient 45, images of the affected parts of the patient etc. are displayed on the display region 12a of the wearable section 10 (refer to FIG. 9A, S149 in FIG. 10, and S171 in FIG. 11). Also, in a case where the doctor 44 is explaining symptoms to the patient 45 while looking at the personal computer 60, images are displayed on the personal computer 60 (refer to FIG. 9B, S151 in FIG. 10, and S169 in FIG. 11 etc.). As a result, with this embodiment also, it is possible to make display of display sections of the wearable section 10 and the external unit 20 (personal computer 60) appropriate in accordance with gaze direction of the user who has fitted the wearable section 10.

Also, with the second embodiment, when the wearable terminal has been fitted, there are reaction information acquisition sensors (image sensor of the image input section 13, microphone of the sound input section 13b, etc.) for acquiring reaction information of a person opposite, and a display controller displays an image, that was displayed on a second display, on a first display unit, based on reaction information that has been acquired by the reaction information sensor (refer, for example, to FIG. 9C and S143 and S145 in FIG. 10). As a result it is possible to automatically carry out appropriate display on the first display section and the second display section in accordance with the surrounding situation. It should be noted that as the reaction information acquisition sensor, with this embodiment, for example, there are the microphone, electronic compass, image input section, and movement sensors such as an inclination detection sensor and gyro etc. but user reaction information may also be detected with other sensors.

As has been described above, with each of the embodiments of the present invention, an object that the user is staring at is detected (refer, for example, to S1 in FIG. 4A, FIG. 4B, and S67 in FIG. 6 etc.), and when displaying an image, that has been displayed by the second display section, on the first display section switching is controlled based on the object (refer, for example, to S3, S5, and S9 in FIG. 4A and S69 and S81 in FIG. 6 etc.). As a result it is possible to appropriately carry out display on the wearable terminal and on an external device in accordance with usage states of the wearable terminal by the user. Specifically, it is possible to carry out appropriate switching of display in accordance with an object that the user is gazing at.

It should be noted that in each of the embodiments of the present invention description has been given for an example where a radio controlled aircraft is controlled by means of a smartphone, and an example where the present invention has been applied to a case of a doctor diagnosing a patient. However, it is possible to apply the present invention to any example as long as it is a system that carries out display on both a wearable terminal and another external unit.

Also, with each of the embodiments of the present invention, description has been given for examples where control sections are executed by a CPU, peripheral circuitry for the CPU, and programs. However, this is not limiting, and it is also possible for some or all functions to have a hardware structure such as gate circuits that have been generated based on a programming language that is described using Verilog, and also to use a hardware structure that utilizes software such as a DSP (digital signal processor). Suitable combinations of these approaches may also be used. Also, results of learning using artificial intelligence may be reflected in various detection functions.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A display system that is capable of displaying substantially the same content on a wearable terminal that is fitted on the head of a user and has a first display, and on a unit other than the wearable terminal and that has a second display, comprising:
    a controller that determines an object the user is gazing at;
    a display controller that controls change of display format based on the object that has been determined, when an image, that has been displayed on the second display, is displayed on the first display; and
    a reaction information acquisition sensor that acquires reaction information of a person across from the user on whose head the wearable terminal is fitted,
    wherein the display controller displays an image, that has been displayed on the second display, on the first display, based on the reaction information that has been acquired by the reaction information position sensor.

2. A mobile information unit that is capable of communication with a wearable terminal that has a first display that is fitted on the head of a user, and that is capable of passing visible light in a direction in which the user directly views reality space, comprising:

a second display that is provided on the mobile information unit;
a controller that detects an object that the user is gazing at;
a display controller that controls change of display format based on the object, when an image, that has been displayed on the second display, is displayed on the first display; and
a reaction information acquisition sensor that acquires reaction information of a person across from the user on whose head the wearable terminal is fitted, wherein
the display controller displays an image, that has been displayed on the second display, on the first display, based on the reaction information that has been acquired by the reaction information position sensor.

3. The mobile information unit of claim 2, wherein:
the controller performs determination based on time variable characteristics of the user's posture, or continuation of a posture for a given time.

4. The mobile information unit of claim 2, wherein:
the controller acquires posture information of the user, and performs determination based on the posture information.

5. The mobile information unit of claim 2, wherein:
the controller acquires surrounding sound information, and performs determination based on this sound information that has been acquired.

6. The mobile information unit of claim 2, wherein:
the controller performs determination based on image information that has been acquired by an imaging section.

7. A wearable terminal that is capable of communication with a mobile information unit that has second display and a controller that determines an object that a user is gazing at when the wearable terminal is fitted on the head of the user, comprising:
a first display provided on the wearable terminal;
a display controller that controls change of display format based on the object, when an image, that has been displayed on the second display, is displayed on the first display; and
a reaction information acquisition sensor that acquires reaction information of a person across from the user on whose head the wearable terminal is fitted,
wherein the display controller displays an image, that has been displayed on the second display, on the first display, based on the reaction information that has been acquired by the reaction information position sensor.

8. The wearable terminal of claim 7, further comprising:
a controller that determines an object the user is gazing at, based on at least one of time variable characteristics of the user's posture, user's posture information, surrounding sound information, and image information that has been acquired using an image sensor.

9. An information display method that is capable of displaying substantially the same content on a wearable terminal that is fitted on the head of a user and has a first display section, and on a unit other than the wearable terminal that has a second display, comprising:
detecting an object that the user is gazing at;
acquiring reaction information of a person across from the user on whose head the wearable terminal is fitted; and
displaying an image, that has been displayed on the second display, on the first display, based on the reaction information, when an image, that has been displayed on the second display, is displayed on the first display.

10. The information display method of claim 9, wherein the object the user is gazing at is determined based on at least one of time variable characteristics of the user's posture, user's posture information, surrounding sound information, and image information that has been acquired using an image sensor.

11. An information display method for a mobile information unit that has a second display, and that is capable of communication with a wearable terminal that has a first display and that is fitted on the head of a user, and that is capable of passing visible light in a direction in which the user directly views reality space, comprising:
detecting an object that the user is gazing at; and
acquiring reaction information of a person across from the user on whose head the wearable terminal is fitted; and
acquiring reaction information of a person opposite, when the wearable terminal has been fitted; and
displaying an image, that has been displayed on the second display, on the first display, based on the reaction information, when an image, that has been displayed on the second display, is displayed on the first display.

12. The information display method of claim 11, wherein:
the object the user is gazing at is determined based on at least one of time variable characteristics of the user's posture, user's posture information, surrounding sound information, and image information that has been acquired using an image sensor.

* * * * *